UNITED STATES PATENT OFFICE 2,235,785

SORBITOL ETHERS

Elwood V. White, Moscow, Idaho, assignor to The Dow Chemical Company, Midland, Mich., a corporation of Michigan No Drawing. Application September 13, 1939, Serial No. 294,681

7 Claims. (Cl. 260—615)

This invention relates to new sorbitol derivatives which have application as components of useful cellulose derivative compositions, as intermediates in the preparation of industrially valuable esters, and the like.

It is an object of the invention to prepare sorbitol ethers having substituent groups in one or more of the 2- or 3-positions of the sorbitol molecule. A further object is the preparation of alkyl or aralkyl ethers of sorbitol substituted in one or more of the 2- or 3-positions. Another object is the preparation of substances adapted for conversion into useful alkyd resins by condensation with polybasic acids.

The objects are attained by converting complex polysaccharide ethers, such as cellulose or starch ethers into glucose ethers substituted in one of the 2- or 3-positions by the process of alcoholysis followed by hydrolysis, as described in co-pending application, Serial No. 294,678, filed concurrently herewith, and reducing the latter to form sorbitol ethers. The process described in the said co-pending application gives a product in which the configuration and positions of the substituent groups are defined. The sorbitol ethers, being derived by a simple reduction step from these glucose bodies, accordingly have similarly positioned substituent groups and are represented by the formula

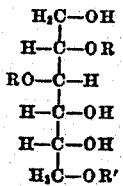

wherein at least one of the groups R is alkyl, aralkyl, or hydroxy alkyl and the balance are hydrogen, and wherein R' is the same alkyl, aralkyl, or hydroxy alkyl group or hydrogen.

The sorbitol ethers of this invention may consist of pure compounds, viz. 2,3,6-tri-substituted sorbitol ethers, a mixture of the 2,3-, 2,6-, and 3,6-di-substituted derivatives, a mixture of the 2- and 3-mono derivatives or, further, mixtures of two or more of these classes of compounds. To prepare mixed sorbitol, ethers, an ether of a complex polysaccharide, for instance, an ether of cellulose, is subjected to a process of alcoholysis followed by hydrolysis and reduction without any intermediate separation steps other than removal of unused reactants and of reaction tars produced during the alcoholysis and hydrolysis. For the preparation of the separated mono-, di- and tri-derivatives, respectively, this process requires several separation steps which may be carried out, for instance, according to the scheme

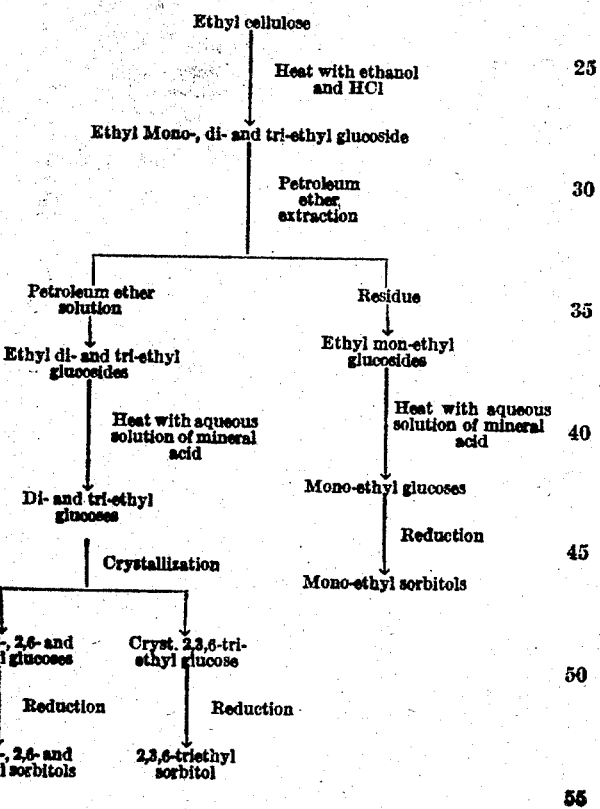

The above flow sheet outlines the process applicable also to propyl and butyl celluloses, as well as to the corresponding alkyl starches, but it is not applicable as a whole to the separation of the methyl polysaccharides (whose hydrolysates are not separable by petroleum ether (or to that of the alkyl polysaccharides where the alkyl group contains more than 4 carbon atoms. Further, a single polysaccharide ether normally will not be chosen as the source of the mono-, di- and tri-substituted sorbitols. The more highly substituted sorbitols are obtained from highly etherified polysaccharides and the mono-derivatives from the corresponding polysaccharide mono-ethers. Any small quantities of mono-derivatives in the first case, or of di- and tri-derivatives in the second, may be separated as above and discarded or, alternatively, the aliphatic hydrocarbon extraction step may be omitted. This latter alternative always will be adopted in the processing of alkylated complex polysaccharides, wherein alkyl contains more than 4 carbon atoms, and of the aralkylated complex polysaccharides because, owing to the solubility of even the mono-substituted glucosides in aliphatic hydrocarbons, separation of mono-derivatives by solution of the more highly substituted derivatives in this solvent is not feasible. It is to be noted, too, that the higher alkyl and the aralkyl ethers of polysaccharides will yield only lower sorbitol ethers, predominantly mono-derivatives, owing to the fact that as the size of the etherifying group is increased it is increasingly difficult to effect complete substitution of the polysaccharide by the usual etherification procedures. Therefore, in such cases any separation other than distillation of glucoside mono-ethers from unetherified glucoside is usually not even necessary.

The sorbitol ethers of this invention include both water-soluble and organo-soluble members. Some of them, for example, the di- and tri-ethyl sorbitols are both water- and organo-soluble, and have application as plasticizers for both the water- and organo-soluble cellulose ethers. Again, these sorbitol ethers all contain at least one primary alcoholic group and at least two secondary alcoholic groups. In most of the new ethers and mixed ethers of sorbitol, both primary alcohol groups are unsubstituted. This makes them eminently suitable for reaction with polybasic acids to form alkyd resins as it has been found that the presence of at least one reactive primary alcoholic, (or alpha hydroxy) group is necessary for the easy, smooth reaction of polyhydric alcohols with polybasic acids, and for the formation of technically useful products. The utility of the new products in this connection is contrasted with the sorbitol ethers derived by direct etherification of sorbitol in which reaction at least one and usually both primary alcoholic groups of the sorbitol molecule are preferentially substituted. Such a reaction, when the degree of etherification is greater than one, yields products containing, as a statistical average, less than one primary alcoholic group which are unsuitable for application in the alkyl resin art.

The following examples illustrate the practice of the present invention. They show the preparation of sorbitol ethers by hydrolysis and reduction of glucoside ethers. It will be apparent to those skilled in the art that both these steps may be carried out in different manners from those detailed without departing from the spirit of the invention.

*Example 1*

Distilled mixed glucosides derived from the alcoholysis of highly substituted ethyl cellulose are dissolved to form complete solution in water. The solution is clarified by boiling with charcoal for from 10 to 15 minutes and filtered away from the charcoal and tarry substances. A light colored solution is obtained to which is added sufficient sulphuric acid to produce a normal solution, which is then boiled under reflux to constant rotation, which required about 10 hours. The so-obtained solution is neutralized with barium hydroxide and barium carbonate, and the precipitated barium sulphate is removed by filtration. The filtrate is evaporated under reduced pressure to crystallization. The crystalline product is filtered from its mother liquor, pressed dry, and recrystallized from distilled water. The mother liquor and washings are further evaporated to obtain additional crops of crystals. The recrystallized substance is 2,3,6-tri-ethyl glucose having a melting point of about 94° to 95° C. and an ethoxyl value of 51.1 per cent. 39 grams of the crystalline tri-ethyl glucose is dissolved in 100 cc. of distilled water and the solution is diluted with 100 grams of 95 per cent ethyl alcohol. This mixture is heated in a pressure vessel for 3 hours at 130° to 140° C. in the presence of catalytically active nickel and under a hydrogen pressure of 1500 pounds per square inch. The catalyst is removed from the reaction mixture by filtration and the clear colorless solution is evaporated to a thick syrup which distills at 178° to 180° C. at 2 mm. pressure. There is obtained 41 grams of thick colorless distillate consisting of 2,3,6-tri-ethyl sorbitol. The product has a refractive index at 20° C. of 1.4607.

*Example 2*

An ethyl cellulose, containing about 42 per cent ethoxy, and corresponding closely to a di-ethyl cellulose, is digested with alcoholic hydrochloric acid, and the so-formed ethyl ethyl glucosides are extracted with petroleum ether. A trace of residue, consisting principally of ethyl monoethyl glucosides, is discarded. The petroleum ether is evaporated and the ethyl diethyl glucosides are hydrolyzed with aqueous mineral acid and evaporated to remove water, after neutralizing the acid and clarifying the solution with charcoal. On evaporation in vacuo, no crystals are obtained, showing substantially no tri-ethyl glucose is present. The mixed di-ethyl glucoses are reduced with hydrogen under pressure in the presence of a nickel catalyst. The so-formed mixed 2,3-, 2,6- and 3,6-diethyl sorbitols are a viscous syrupy mass having a refractive index at 20° C. of 1.4700.

*Example 3*

Ethyl mono-ethyl glucoside, from the acid alcoholysis of a low ethoxy ethyl cellulose, is dissolved in water, boiled with charcoal to effect clarification, filtered to remove the charcoal and insoluble tar, and hydrolyzed with dilute sulphuric acid. A crystalline mono-ethyl glucose is obtained on evaporation of the neutralized hydrolysate, which, when reduced with hydrogen in the presence of a nickel catalyst, gives an initially liquid mono-ethyl sorbitol having a refractive index at 20° C. of 1.4938. On standing, the product partially crystallized to give soft or gummy low melting crystals.

Example 4

An unseparated mixture of ethyl sorbitols, prepared as in Example 2 from a low ethoxy ethyl cellulose, but without petroleum ether separation, had a refractive index at 20° C. of 1.4718 and an average ethoxy value of about 1.74 groups per mol. This average analysis corresponds to that of a mixture of about 3 mols of diethyl sorbitols and about 1 mol of mono-ethyl sorbitol.

There is some evidence that some of the sorbitol ethers are altered somewhat in their structure when subjected to prolonged heating during distillation, possibly with the formation of etherified sorbitans. If such structural change is undesirable, any necessary distillation should be carried out rapidly, and at as low absolute pressure as possible.

I claim:

1. An ether of sorbitol, wherein at least one of the 2- and 3-positions is occupied by an etherifying radical selected from the class consisting of (a) alkyl radicals, (b) aralkyl radicals, and (c) hydroxy alkyl radicals, and the other of the 2- and 3-positions and the 6-position are each occupied by a member of the class consisting of hydrogen and the same alkyl, aralkyl and hydroxy alkyl radicals the 1-, 4-, and 5-positions being unetherified.

2. An ether of sorbitol having the general formula

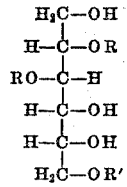

wherein at least one R is an alkyl radical, and the other R and R' are each independently selected from the class consisting of hydrogen and the same alkyl radical.

3. An ethyl ether of sorbitol having at least the primary alcohol group in the 1-position unsubstituted, at least the secondary alcohol groups in the 4- and 5-positions unsubstituted, and at least one of the 2- and 3-positions occupied by the ethyl radical as an etherifying substituent.

4. A mono-ethyl sorbitol, wherein the ethyl group is in one of the 2- and 3-positions, the other five hydroxyls being unsubstituted.

5. A diethyl ether of sorbitol, wherein the ethyl groups occupy two of the 2-, 3-, and 6-positions.

6. A mixture of sorbitol diethyl ethers consisting essentially of 2,3-, 2,6-, and 3,6-diethyl sorbitols.

7. 2,3,6-tri-ethyl sorbitol.

ELWOOD V. WHITE.